United States Patent Office.

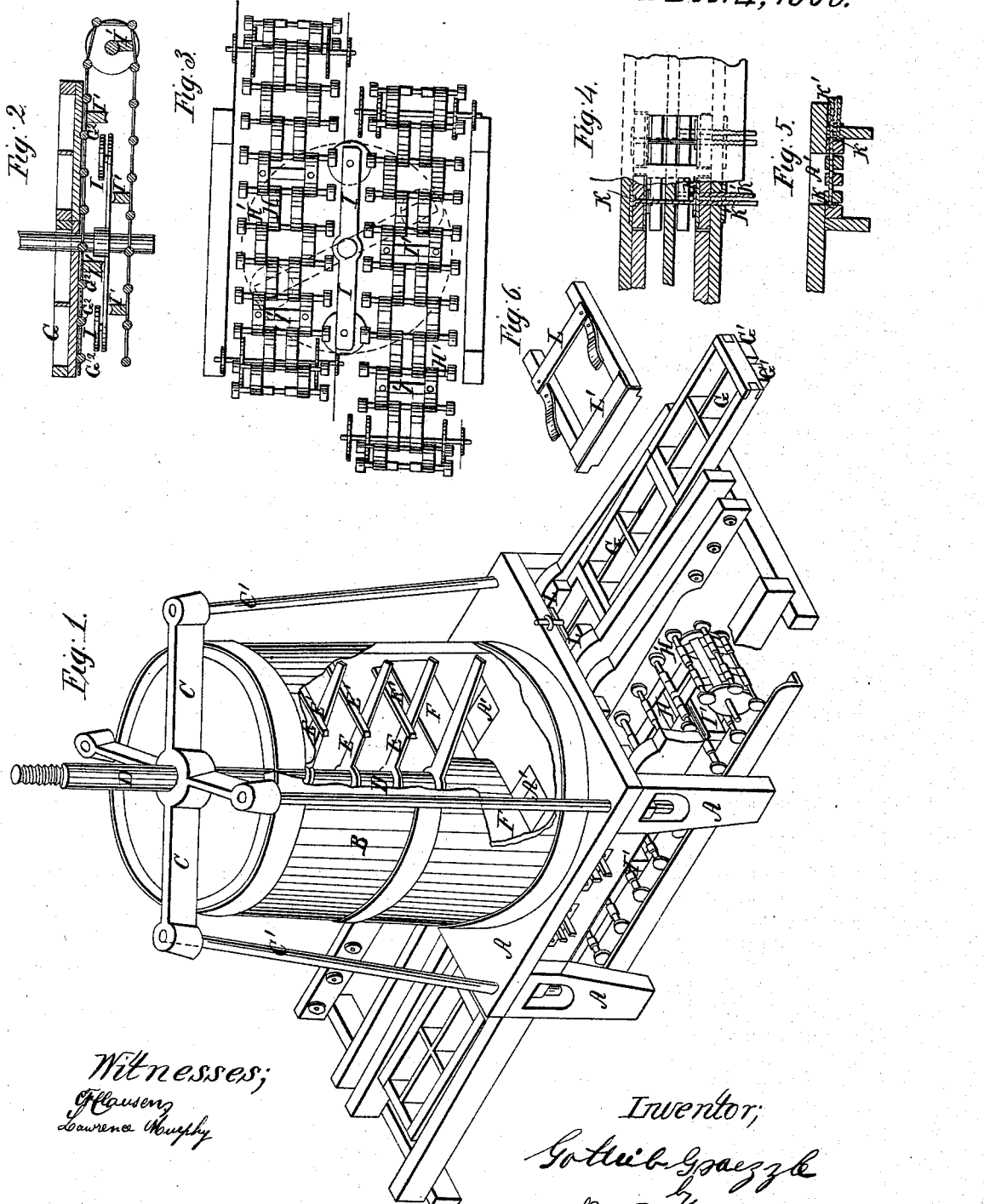

IMPROVED BRICK MACHINE.

G. GRAEZZLE, OF HAMILTON, OHIO.*

Letters Patent No. 60,175, dated December 4, 1866.

SPECIFICATION.

TO ALL WHOM IT MAY CONCERN:

Be it known that I, GOTLIEB GRAEZZLE, of Hamilton, in the county of Butler, and State of Ohio, have invented a new and useful improvement in Machines for Making Brick; and I do hereby declare that the following is a full, clear, and exact description of the construction and operation of the same, reference being had to the annexed drawings, making part of this specification, in which—

Figure 1 is a perspective view.
Figure 2 is a longitudinal vertical section.
Figure 3 is a plan view of the bottom.
Figure 4 is a plan view of the adjusting mechanism.
Figure 5 is a vertical section of the same.
Figure 6 is a detached view of the knife or scraper for finishing the top of the bricks.

In the several figures I use the same letters in referring to identical parts.

The following description will enable one skilled in the art to construct and operate the machine.

A is a strong frame, with four or more legs, upon which the entire machine is supported. B is a curb resting on the frame, A, over which I place the cross-piece, C, held in place by the curb on which it rests and by the rod C' passing through the main frame. Through the eye of the cross-piece, C, passes the vertical shaft, D, which is revolved by horse or other power, and carries with it the arms, E, which in connection with the arms, E, attached to the interior of the curb, grind and temper the clay in the ordinary mode. On the shaft, D, immediately above the flooring, at the bottom of the curb, I attach the two radial arms, F, which are flat on their faces and inclined at about an angle of 45° in the direction in which the shaft revolves. These arms or wings, as they revolve, press the prepared clay through the rectangular holes, A', cut in the floor, filling the moulds, G, passing under these holes, rotating with the motion of the endless chains, H, which, placed on each side of the machine, revolve in opposite directions. The links of the endless chain are joined by rods, H', which rise above the surface of the link. On the bottom of the moulds, I place ribs, G', or I form the bottom of the moulds thick enough to dispense with the ribs. Across the bottom thus formed, I cut semicircular grooves corresponding in distance with and made of proper size to receive the rods, H'. The moulds being placed on the endless apron, are carried under the opening, A', and filled with clay by the action of the wings F. As they are carried forward they pass under the edge of the knife, L', which is inserted on the frame, L, (fig. 6,) and passed under the floor, so that the knife shall shave the top of the brick as the mould passes from under the opening, A'. The shaft D extends below the floor on the frame and has attached, at its lower end, the arms, I, on each outer end of which are set, on a suitable wrist pin, the friction-wheels, I, which, with the revolution of the shaft and arm, bear against cleats on the endless aprons, shown at I', carrying the aprons in opposite directions with the revolution of the shaft. The moulds are lifted off as they successively pass from under the frame, A. In order to adjust the feed according to the condition of the clay, I insert in the edge of each opening, A', a plate, K, which may be moved out and in by the screws, K', passing to the outside of the frame. By changing the positions of the plates, K, the lateral width of the openings A' is increased or diminished as may be necessary.

What I claim as my invention, and desire to secure by Letters Patent, is—

1. The arrangement of the frame L, and knife L', in relation to the moulds G, when carried upon an endless apron H, substantially as set forth.

2. The combination of an endless apron H, having cleats I', with the revolving arms I, when constructed and arranged substantially as and for the purpose set forth.

3. The combination of the endless aprons H, and moulds G, when respectively constructed and arranged substantially as set forth.

4. The openings A', when constructed with adjustable plates K, operated substantially in the manner and for the purpose set forth.

In testimony whereof I have signed my name to this specification in the presence of two subscribing witnesses.

G. GRAEZZLE.

Witnesses:
SAM. D. FITTON,
JOHN BACHMANN.

* Assignor to Jacob Roop and Stephen Hughes.